United States Patent Office

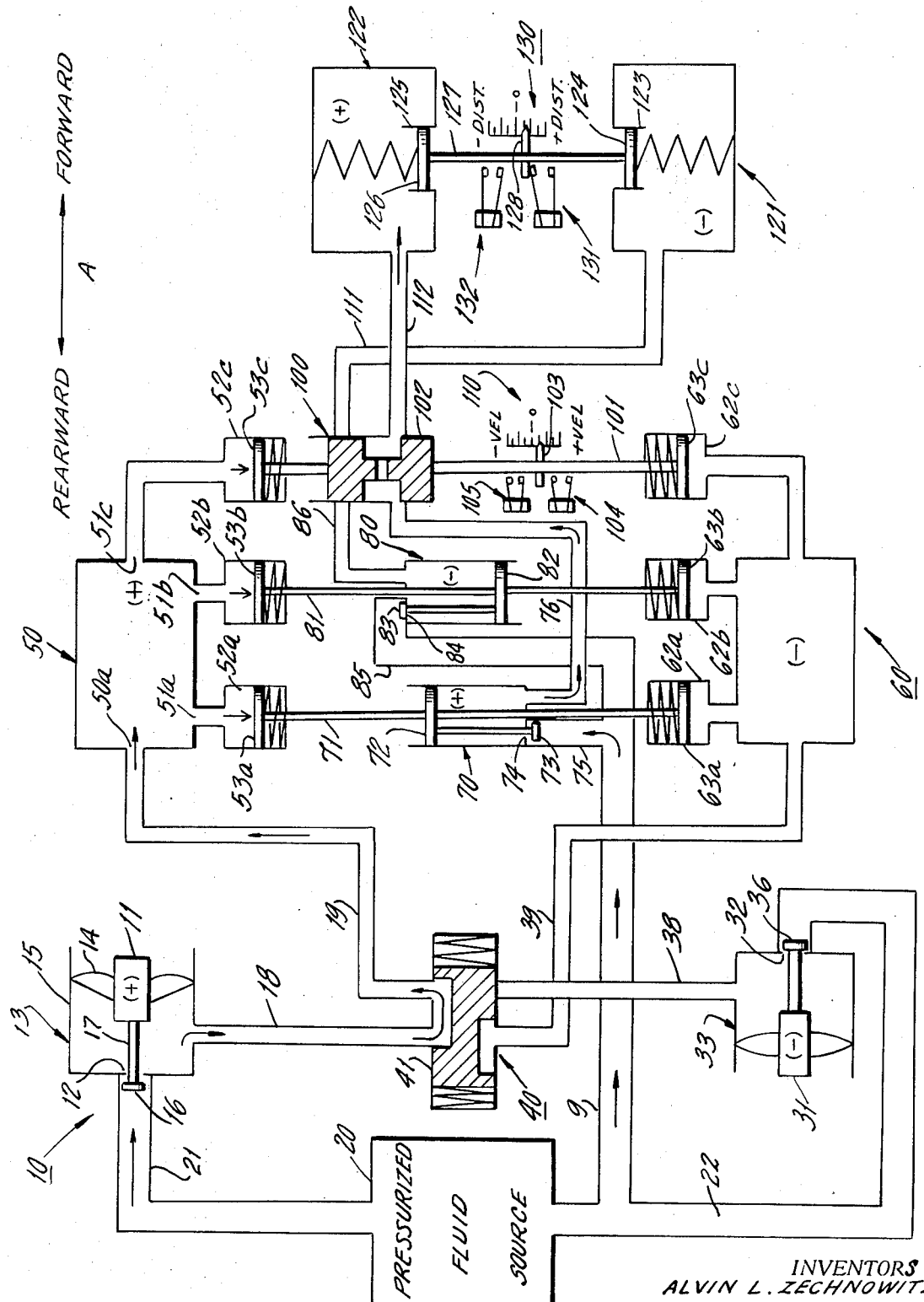

3,540,288
Patented Nov. 17, 1970

3,540,288
PNEUMATIC DISTANCE METER AND
VELOCIMETER
Alvin L. Zechnowitz, Howard Beach, and Nai-Chong
Chang, Scarsdale, N.Y., assignors to Sperry Rand Corporation, Long Island City, N.Y., a corporation of
Delaware
Filed May 1, 1967, Ser. No. 634,950
Int. Cl. G01p 3/52, 3/64
U.S. Cl. 73—490   4 Claims

ABSTRACT OF THE DISCLOSURE

An all pneumatic distance and velocity measuring apparatus is constructed utilizing valves with fixed sized orifices by varying regulated pressure levels as a function of acceleration and velocity. Such apparatus includes individual manifolds wherein fluid pressure buildup is controlled by individual inertia operated pressure regulator valves with the pressure difference between the manifolds being related to velocity. In addition, individual reservoirs are connected to the source of pressurized fluid in accordance with direction being travelled with an output means being connected to these reservoirs to produce an output related to distance travelled.

---

This invention relates to pneumatic velocity and distance measuring devices utilizing acceleration detecting elements. More particularly, this invention relates to devices of this type having valves with fixed sized orifices, constituting means for varying regulated pressure levels as a function of acceleration and velocity.

For the most part, prior art precision velocity and distance measuring apparatus require electrical power, are radiation sensitive and/or require complex components for electrical and/or mechanical integration. Thus, such apparatus are very expensive to manufacture or present certain operational difficulties. To a great extent, these operational difficulties are eliminated by prior art devices of this type utilizing fluid pressure means controlled by acceleration sensitive valves. However, the fluid operated devices of this latter type provided by the prior art maintain a constant regulated pressure and vary a valve orifice as a function of acceleration or velocity to obtain outputs.

In order to avoid the expense of manufacturing accurate valves having variable orifices, the fluid operated distance and velocity measuring apparatus of the instant invention is constructed with valves having fixed sized orifices with control being achieved by utilizing such valves to regulate pressure levels as functions of acceleration and velocity to produce the required velocity and distance outputs.

Accordingly, a primary object of the instant invention is to provide novel fluid operated means for deriving velocity and/or distance travelled related outputs.

Another object is to provide a device of this type that does not require electrical power for operation.

Still another object is to provide a device of this type which is reliable yet is relatively inexpensive to produce.

A further object is to provide a device of this type which utilizes valves having fixed orifices, rather than valves having varying orifices, to regulate pressure levels as functions of acceleration and velocity.

These objects, as well as other objects of this invention will become readily apparent after reading the following description of the accompanying drawing in which the single figure is a schematic of a fluid operated velocity and distance measuring device constructed in accordance with the teachings of the instant invention. In such figure the apparatus elements are shown positioned under conditions of forward acceleration and forward velocity at a time after the apparatus has travelled a net distance in the forward direction.

Now referring to the figure. Velocity and distance measuring apparatus 10 is mounted to a vehicle frame (not shown) with inertia masses 11, 31 mounted for movement parallel to measuring axis A. Pressurized fluid source 20 is connected through conduit 21 to the fixed orifice 12 constituting the input port for forward acceleration pressure regulator valve 13. Inertia mass 11 is mounted at the center of diaphragm 14 having its periphery fixedly secured to valve housing 15. Member 16 for closing orifice 12 is mounted to the rear of orifice 12 on rod 17 extending rearwardly from inertia mass 11. The exit of valve 13 is connected through conduit 18 to acceleration direction sensing valve 40. With movable valve element or spool 41 in the position shown, valve 40 connects conduit 18 to conduit 19 extending to input port 50a of forward velocity manifold 50 having output ports 51a, 51b, 51c connected to the respective cylinders 52a, 52b, 52c.

Rearward acceleration pressure regulator valve 33 is of the same construction as valve 13 and is connected to valve 40 in a similar manner. However, it is noted that inertia mass 31 of valve 33 is mounted for movement upon rearward acceleration of apparatus 10. Further, rearward velocity manifold 60 is of the same construction as manifold 50 and is connected to valve 40 and cylinders 62a, 62b, 62c in the same manner that manifold 50 is connected to valve 40 and cylinders 52a, 52b, 52c.

Piston 53a within cylinder 52a is secured at one end of rod 71 having its other end secured to piston 63a within cylinder 62a. Movable member 72 of velocity difference pressure regulator valve 70 is connected to rod 71 at a point intermediate the ends thereof and carries member 73 for closing the input port 74 of valve 70. Input port 74 is connected through conduits 75 and 9 to pressure fluid source 20. The output port of valve 70 is connected through conduit 76 to one of the input ports of automatic selector or direction sensor valve 100 having output ports connected through conduits 111, 112 to the respective rearward and forward displacement reservoirs 121, 122.

Piston 53b within cylinder 52b is connected to rod 81 at one end thereof while piston 63b within cylinder 62b is connected to rod 81 at the other end thereof. Piston 82 of pressure regulator valve 80 is connected to rod 81 at a point intermediate the ends thereof and carries member 83 for closing input port 84 of valve 80. Conduits 9 and 85 connect pressurized fluid source 20 to input port 84. Conduit 86 connects the output port of valve 80 to the other input port of selector valve 100.

Piston 53c within cylinder 52c is connected to one end of rod 101 while piston 63c within cylinder 62c is connected to the other end of rod 101. Spool 102 of selector valve 100 is secured to rod 101 at a point intermediate the ends thereof so as to be movable therewith. Pointer 103 of velocity readout means 110 is secured to rod 101 at a point intermediate the ends thereof and provides an indication of the difference in pressures between the forward velocity manifold 50 and the rearward velocity manifold 60 (the analog of net vehicle velocity). The rearwardly extending portion of pointer 103 is engageable with switches 104, 105 to close such switches at predetermined forward and rearward velocities, respectively, for control purposes or any desired purpose.

Reservoir 121 is formed with inwardly extending hollow cylinder 123 having piston 124 disposed therein. Similarly, reservoir 122 is provided with hollow cylinder 125 having piston 126 disposed therein. Pistons 124 and 126 are secured to opposite ends of rod 127. Pointer 128 of distance readout means 130 is secured to rod 127 at a point intermediate the ends thereof and provides an indication of the difference in pressures between the forward displacement reservoir 122 and the rearward displacement reservoir 121 (the analog of net vehicular distance traveled). The rearward extension of pointer 128 is engageable with switches 131, 132 to close such switches after predetermined forward and rearward distances, respectively, have been travelled.

The numerous biasing springs which appear in the figure have not been specifically referred to since it should now be apparent to those skilled in the art that some of these springs function to normally center indicator elements or valve elements and in other instances, normally close certain valve elements.

The elements of apparatus 10 are shown in the positions each will occupy under conditions of forward acceleration (to the right with respect to the figure) and forward velocity. Under these conditions, inertia mass 11 is subjected to relative movement to the rear thereby opening input port 12 of pressure regulator 13 permitting pressurized fluid from source 20 to flow into line 18. Spool 41 of acceleration direction sensor valve 40 being in the rearward position shown provides a connecting passage between conduits 18, 19 so that pressurized fluid flows into forward velocity manifold 50 to increase the pressure acting downwardly on pistons 53a 53b, 53c. So long as the pressure in manifold 50 exceeds the pressure in manifold 60, input port 84 of pressure regulator 80 is closed.

Assuming that the pressure within manifold 50 exceeds the pressure within manifold 60, rod 71 moves downward opening input port 74 of pressure regulator 70 so that the latter provides a connection, through conduits 9, 75 and 76, from source 20 to one of the inputs of direction sensor 100. Spool 102 is in its downward position shown since the pressure within manifold 50 exceeds the pressure within manifold 60. Thus, valve 100 provides a connection between conduits 76 and 112 thereby admitting pressurized fluid into forward displacement reservoir 122.

The pressurized fluid from source 20 acts on diaphragm 14 in opposition to the forward acceleration force acting on mass 11. A force balance, between the acceleration reaction force on the inertia mass 11 and the pressure effect integrated over the area of the diaphragm 14 that supports the mass 11, results in a regulated pressure that is proportional to the applied acceleration. At such time as these forces balance, member 16 closes port 12 of pressure regulator 13.

Also, fluid flow into forward velocity manifold 50 ceases when spool 41 of acceleration direction sensor valve 40 is in its center position or forward thereof. The acceleration direction sensor valve 40 is also affected by the applied acceleration to permit the regulated pressure fluid to flow into the forward velocity manifold 50 (through its fixed orifice) only while forward acceleration is applied. The effect on rearward acceleration is similar.

The input port of pressure regulator 70 remains open so long as the force on rod 71 derived from the pressure within manifold 50 exceeds the force in the opposite direction on rod 71 derived from the pressures within manifold 60. A balance of forces, due to the integrated effects of fluid pressure on the movable member 72 surface area, results in a regulated pressure that is proportional to vehicle velocity. When spool 102 of direction sensor 100 is in its center position or above such position, fluid flow into forward displacement reservoir 122 ceases. Rod 127 is driven downward by an excess in pressure in reservoir 122 over the pressure within reservoir 121 so that pointer 128 indicates that a net forward distance has been travelled.

Under conditions of rearward acceleration, inertia mass 31 of pressure regulator valve 33 moves relatively to the right with respect to the figure so that member 36 no longer closes input port 32 and valve 33 provides a connection between conduits 22 and 38. During rearward acceleration, spool 41 moves relatively to the right so that valve 40 provides a connection between conduits 38 and 39. Under these conditions, there is a path for fluid flow from source 20 to rearward velocity manifold 60. Such path consists of conduit 22, pressure regulator valve 33, conduit 38, acceleration direction sensor valve 40, and conduit 39.

Pressurized fluid admitted to manifold 60 creates forces which move rods 71, 81 and 101 upward. When the pressure within manifold 60 exceeds the pressure within manifold 50, pressure regulator 70 closes and pressure regulator 80 opens. In addition, direction sensor valve 100 provides a connection between conduits 86 and 111. Under these new conditions, a fluid passage is created between source 20 and rearward displacement reservoir 121 with this passage consisting of conduits 9, 85, pressure regulator 80, conduit 86, direction sensor valve 100, and conduit 111. Now pressurized fluid is admitted to rearward displacement reservoir 121 and as a result, rod 127 begins to move upward indicating that travel is to the rear.

Thus, it is seen that the instant invention provides a novel construction for a fluid operated velocity and distance measuring device. Pressure regulator valves having fixed sized orifices are utilized to achieve varying regulated pressure levels in accordance with acceleration and velocity to produce outputs indicating both forward and rearward velocities and distances travelled.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A device for detecting inertial data along a measuring axis; said device including a supply of fluid under pressure; a first and second manifold each having an input port for receiving pressurized fluid and at least one output port for discharging said fluid; first and second means providing respective first and second passages from said supply to the respective first and second manifold input ports; an acceleration direction sensing means having portions connected in series in the respective first and second passages, said sensing means blocking said first means under conditions of rearward acceleration and blocking said second means under conditions of forward acceleration; first and second valve means connected in series in the respective first and second means; said first and second valve means including respective first and second inertia means for opening the respective first and second valve means in response to forward and reverse accelerations, respectively; first and second chamber means connected to the downstream side of the first and second valve means respectively; said first and second inertia means each including means connected to said first and second chamber means respectively and responsive to the pressure in the respective chamber means; under conditions of forward acceleration fluid pressure within said first chamber means exerting a first force upon said pressure responsive means of said first inertia means in opposition to forward acceleration forces acting on said first inertia means with said first valve means being open so long as said forward acceleration forces exceed said first force and under conditions of rearward acceleration fluid pressure within said second chamber means exerting a second force upon said pressure responsive means of said second inertia means in opposition to rearward acceleration forces acting on said second inertia means with said second valve means being open so long as said rearward acceleration forces exceed said second force whereby said first and second chamber means provide a pressure representative of the respective forward and rearward accelerations; and velocity indicating means connected to said manifold output ports in a manner such that forces derived from pressure at said manifold output ports act in opposite directions to position an indicator coupled to said velocity indicating means for providing in response to differential pressures applied thereto an analog indication of velocity.

2. A device as set forth in claim 1 also including a first reservoir; third means providing a third passage from said supply to said first reservoir; said third means including a third valve means; said third valve means being connected to said first and second manifolds such that forces derived from the respective pressures therein operate in a manner to open said third valve means and provide pressure therefrom representative of said velocity when the pressure in the first manifold exceeds that in the second manifold; said velocity indicating means including means cooperating with said third valve means to transmit pressure therefrom to said first reservoir during the interval said third valve means is open; and output means connected to said first reservoir and responsive to the pressure therein to provide an output related to forward distance travelled.

3. A device as set forth in claim 2 also including a second reservoir; fourth means providing a fourth passage from said supply to said second reservoir; said fourth means including a fourth valve means; said fourth valve means being connected to said first and second manifolds such that the forces derived from the respective pressures therein operate in a manner to open said fourth valve means and provide pressure therefrom representative of said velocity when the pressure in the second manifold exceeds that in the first manifold; said cooperating means of said velocity indicating means co-acting with said fourth valve means to transmit pressure therefrom to said second reservoir during the interval said fourth valve means is open; and said output means being also connected to said second reservoir and responsive to the pressure therein to provide an output related to net distance travelled forward and back.

4. A device as set forth in claim 3 wherein said cooperating means of said velocity indicating means comprises an automatic selector valve means having portions connected in series in the respective third and fourth passages; said selector valve blocking said third passage when the pressure in the second manifold exceeds the pressure in the first manifold; said selector valve blocking said fourth passage when the pressure in the first manifold exceeds the pressure in the second manifold; and said selector valve blocking both said third and fourth passages when pressures within said first and second manifolds are equal.

References Cited
UNITED STATES PATENTS 2,338,536   1/1944   Plaut-Carcasson _____ 73—490
1,728,904   9/1929   Herr _____ 73—490

JAMES J. GILL, Primary Examiner

H. GOLDSTEIN, Assistant Examiner

U.S. Cl. X.R.

73—503